PROCESS FOR THE PREPARATION OF A SEMIPERMEABLE MEMBRANE FROM POLYMERIZED β-LACTAM UNSUBSTITUTED AT THE NITROGEN ATOM

Filed Dec. 29, 1969

United States Patent Office 3,703,570
Patented Nov. 21, 1972

3,703,570

PROCESS FOR THE PREPARATION OF A SEMIPERMEABLE MEMBRANE FROM POLYMERIZED β-LACTAM UNSUBSTITUTED AT THE NITROGEN ATOM

Walter Busch, Wiesbaden-Biebrich, and Franz Schwarzer, Wiesbaden, Germany, assignors to Kalle Aktiengesellschaft, Wiesbaden-Biebrich, Germany
Filed Dec. 29, 1969, Ser. No. 888,929
Claims priority, application Germany, Dec. 31, 1968, P 18 17 542.3
Int. Cl. B29d 7/22, 27/04; C08g 20/10
U.S. Cl. 264—41 7 Claims

ABSTRACT OF THE DISCLOSURE

This invention relates to an improvement in the process for the preparation of a semipermeable membrane by pouring a layer of a solution of a plastic onto a support, evaporating a portion of the solvent from the layer whereby the layer is provided with a surface layer poor in solvent, and removing the remaining solvent from the layer by means of a liquid which is miscible with the solvent but does not dissolve the plastic, the improvement comprising employing as the plastic at least one polyamide which is a polymerized β-lactam unsubstituted at the nitrogen atom.

Figure 1:
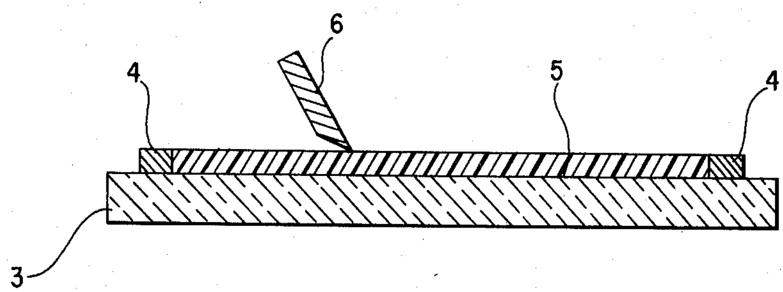

This invention relates to a process for the preparation of a semipermeable membrane from a solution of a plastic.

It is known to use so-called semipermeable membranes for separating or enriching a material consisting of a flowable multi-substance mixture. These are membranes of which the permeability, for a certain constituent of the flowable multi-substance mixture, particularly in the presence of a pressure difference between both sides of the membrane, is considerably different from their permeability with respect to another constituent of the multi-substance mixture. A practical example thereof is the removal of salt from salt-containing water by means of semipermeable membranes with the application of pressure, e.g. of 50 to 100 kg./cm.$^2$, according to the principle of the so-called reverse osmosis. The separating effect of the membrane results from the more or less perfect impermeability of the membrane with respect to the retained constituent of the flowable multi-substance mixture.

It is further known to prepare semipermeable membranes from certain plastic materials, e.g., from cellulose derivatives, in that a layer, from a solution of the plastic material concerned, is poured onto a support, a portion of the solvent of the solution is evaporated from the plastic layer on the support whereby the plastic layer is provided with a surface layer poor in solvent, and the remaining solvent of the solution is then removed from the plastic layer by means of a liquid which does not dissolve the plastic material but is miscible with the solvent. An unsymmetrical membrane is thereby obtained which consists of a semipermeable surface layer and a permeable supporting layer. The semipermeable surface layer is the surface layer poor in solvent, which is formed upon evaporation of a portion of the solvent from the plastic layer. The permeable supporting layer is the other part of the plastic layer formed by the removal of the remaining solvent by means of the liquid. Its permeability results from the precipitation of the plastic material by the liquid immiscible therewith, which precipitation, under the selected working conditions, results in a porous structure of the plastic material, i.e. a structure which can be permeated by liquids in a hydrodynamic flow. The semipermeable surface layer, however, effects the procedure of separation. The degree of its permeability to individual constituents of a solution, inter alia, depends on the kind of plastic material employed, on the thickness of the membrane, on the kind of solvent used, and on the liquid employed not dissolving the plastic material. In the preparation of the known semipermeable membranes, the semipermeability thereof has been adjusted for a certain time to a desired value by heating to a certain temperature. It thus depends on the individual manufacturer to prepare membranes of different semipermeabilities.

The present invention relates to a process for the preparation of a semipermeable membrane, which is somewhat similar to the above-described method. This method is described in U.S. Pat. Nos. 3,133,132; 3,133,-137; 3,170,867; 3,283,042; 3,310,488; 3,344,214; and 3,364,288. Insofar as the process details described in these patent specifications can be regarded as being within the scope of the present application, reference thereto is explicitly made herewith.

The known semipermeable membranes change their semipermeability when subjected to an elevated temperature, e.g. of 80° C., as stated above. The known semipermeable membranes should not be exposed for as long as several hours to such a temperature or even more briefly to an elevated temperature above 90° C., since they then become impermeable and thus useless. Another disadvantage of the known semipermeable membranes is their relatively low resistance to chemicals, such as salt solutions, acids, and bases.

The present invention provides a process for the preparation of a semipermeable membrane which has a better resistance to heat and chemicals than do the known semipermeable membranes. This is achieved by starting from a process for the preparation of a semipermeable membrane, in which, according to the known method described above, the membrane is prepared by pouring a layer of a plastic solution, if desired containing salt, onto a support, a portion of the solvent is evaporated from the plastic layer while the latter is on the support whereby the plastic layer is provided with a surface layer poor in solvent, and the remaining solvent of the plastic layer is then removed by means of a liquid which is miscible with the solvent but does not dissolve the plastic material. In accordance with the invention, a plastic solution is used in the process for pouring the layer which contains, as the plastic material, a polyamide which is a polymer of a β-lactam unsubstituted at the nitrogen or a mixture of such β-lactams.

The plastic materials employed in accordance with the invention for the preparation of the semipermeable membrane are known from published German patent application No. 1,141,452 as well as from the publication of Graf, Lohaus, Börner, Schmidt, and Bestian in the journal "Angewandte Chemie," vol. 74 (1962), pp. 523–530. They are polymers, the basic substance of which is acetidin-2-one, which has the following structure:

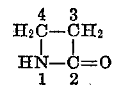

In this formula, substituents replacing hydrogen atoms of the two methylene groups are indicated as being in 3- or 4-position. Useful β-lactams are, for example, 4,4-dimethylacetidin-2-one, 3,4,4-trimethylacetidin-2-one, 4,4-diethylacetidin-2-one, 4-methyl-4-propylacetidin-2-one or 4-phenylacetidin-2-one. In the preparation of the membrane, the poly-β-lactam is dissolved, for example, in 85 to 100 percent by weight formic acid, concentrated sulfuric acid, methanolic calcium rhodanide, calcium chloride or zinc chloride solution, trifluoroethanol, dichloroacetic acid, fluoraldihydrate, hexafluoroacetone hydrate or dimethyl formamide containing lithium chloride. Other solvents dissolving the poly-β-lactam are also useful. Water is generally used as the liquid for precipitating the poly-β-lactam but other precipitating liquids, e.g. methanol or acetone, also are useful; 85 to 100 percent formic acid and 40 percent methyl alcoholic calcium rhodanide solution have proved to be the best of all solvents tested.

The poly-β-lactam solution is poured onto a substantially smooth support, e.g. a glass plate, so that the solution forms a layer. The layer is left standing for some time on the support, whereas solvent evaporates from the surface of the plastic layer. After standing, the plastic layer is immersed, together with the support, into a liquid which is a precipitating agent for the poly-β-lactam and is miscible with the solvent of the solution. If desired, the plastic layer is against immersed once or several times into a precipitating liquid. The time during which the poured plastic layer is left standng on the support depends upon the permeability desired of the membrane prepared. Its permeability, of course, also depends on other factors, e.g. the type of solvent, the temperature of the layer, or the degree of saturation with the solvent in the atmosphere above the layer surface.

The permeability of the membrane is also determined, of course, by the type of poly-β-lactam employed. If desired, additions may be added to the poly-β-lactam solution, e.g. salts, which are soluble in the liquid employed for precipitating the poly-β-lactam, in order to increase the permeability of the membrane to be prepared. The use of plastic solutions containing additives in the preparation of semipermeable membranes is known, in principle, from the U.S. patent specifications indicated above.

The semipermeable membranes prepared in accordance with the invention surprisingly are distinguished by high resistance to elevated temperatures. They thus may be used in separation procedures to be performed at elevated temperatures. The performance of the membranes in liters per hour may be considerably increased by increasing the working temperature. Due to the temperature resistance, it is further possible to sterilize the membranes by steam. The membranes are further distinguished by high resistance to chemicals, such as salts, acids, and bases, as well as to enzymatic degradation. The membranes also have excellent mechanical properties such as high elasticity and stability.

Figure 2:
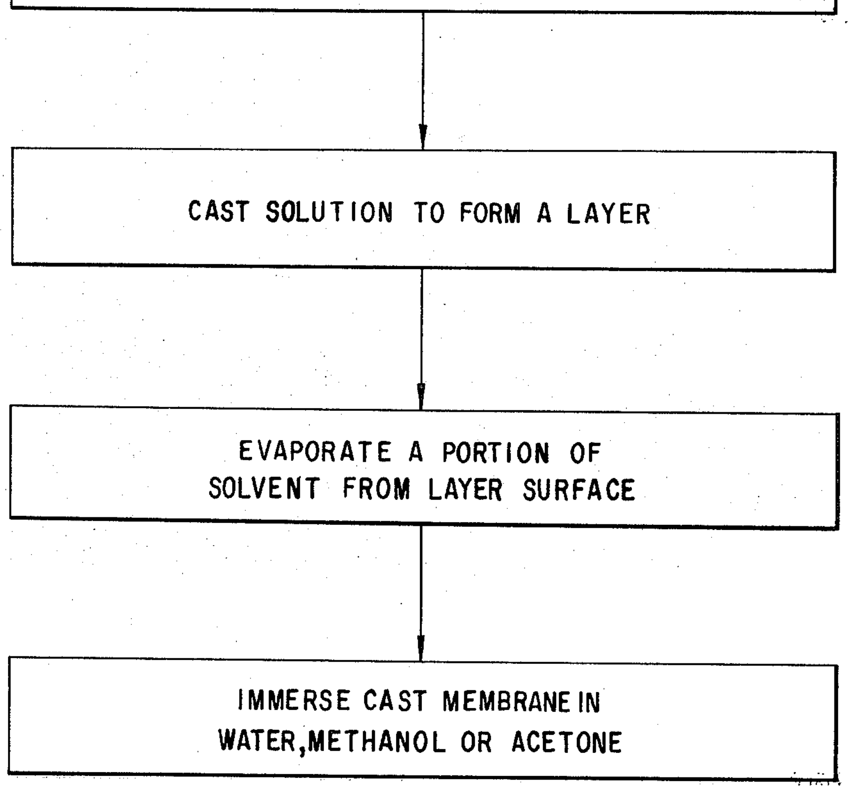

The invention will be further illustrated by reference to the accompanying drawings in which:

FIG. 1 is a schematic cross-section of casting apparatus suitable for performing the process of the invention and FIG. 2 is a block diagram of a flow sheet for the process.

Referring to FIG. 1, a solution of the beta-lactam polymer is cast on a smooth support such as a glass plate 3 having side runners 4 to provide the desired thickness of the layer 5 as cast. The inclined knife 6 is passed over the layer to insure uniformly of thickness.

The invention will be further illustrated by reference to the following specific examples:

EXAMPLE 1

A copolymer containing 70 percent by weight of 4-methylacetidin-2-one and 30 percent by weight of 3,4-dimethylacetidin-2-one is dissolved in concentrated formic acid to form a 25.25 percent by weight solution which, at 20° C., has a viscosity of 23,000 cp.

The solution is brefly subjected to a vacuum produced by means of a water-jet pump in order to remove air therefrom. A 0.26 mm. thick layer of the solution is then poured onto a glass plate by means of a doctor blade and the layer is left standing in the open on the glass plate for 5 seconds at room temperature. The glass plate is then immersed, together with the layer, several times into distilled water at a temperature of 20° C. until the immersion water no longer exhibits an acid reaction after immersion. The membrane thus obtained has a thickness of about 0.10 mm. For determining the semipermeability of the membrane, water containing 0.05 percent by weight of sodium chloride and 0.05 percent by weight of magnesium sulfate is passed over the surface in a turbulent stream under a superatmospheric pressure of 40 atmospheres. At a temperature of 20° C., 200 liters of water per square meter penetrate the membrane in 24 hours while 90 percent by weight of the magnesium sulfate and 50 percent by weight of the sodium chloride are retained by the membrane. At a temperature of 80° C., 1,630 liters of water per square meter of the membrane are passed through in 24 hours, the same percentage by weight quantities of the salts being retained.

The membrane obtained is thus suitable, for example, to produce potable water from brackish water.

The example also shows that the membrane can be used at an elevated temperature and that the relative permeabilities are substantially unchanged by a temperature change.

EXAMPLE 2

A polymer of 4-methylacetidin-2-one is dissolved in concentrated formic acid to form a 12.7 percent by weight solution which, at 20° C., has a viscosity of 12,650 cp.

After removing the air, as described in the above Example 1, the solution is poured in a 0.26 mm. thick layer onto a glass plate by means of a doctor blade and the layer is left standing in the open on the glass plate for 30 seconds at room temperature. The glass plate is then immersed, together with the layer, in distilled water until the immersion water remains neutral.

The membrane obtained has a thickness of about 0.10 mm. At 20° C., it permits 5,000 liters of water per square meter to pass through under a superatmospheric pressure of 40 atmospheres gauge.

Four liters of an aqueous solution were passed through in a circulating process for one hour, on 100 cm.[2] of the membrane on one side, under a superatmospheric pressure of 40 atmospheres. The solution originally contained 2 percent by weight of carboxymethyl cellulose and 0.4 percent by weight of sodium chloride; its viscosity was 20 cp. at 20° C. After circulating for one hour, 2 liters of the solution had diffused through the membrane. The remaining solution contained the entire quantity of the carboxymethyl cellulose, i.e. 4 percent by weight, but its content of sodium chloride was 0.4 percent by weight as before.

The membrane is thus suitable for enriching and desalting water-soluble high-molecular weight substances by dialysis.

It will be obvious to those skilled in the art that many modifications may be made within the scope of the present invention without departing from the spirit thereof, and the invention includes all such modifications.

What is claimed is:

1. A process for the preparation of a semipermeable membrane which comprises applying to a support a solution of a polymerized β-lactam unsubstituted at the nitrogen atom, evaporating a portion of the solvent from the layer whereby the layer is provided with a surface layer poor in solvent, and removing the remaining solvent from the layer by means of a liquid which is miscible with the solvent, said solvent being selected from the group consisting of 85 to 100 percent by weight formic acid, concentrated sulfuric acid, methanolic calcium rhodanide, calcium chloride solution, zinc chloride solution, trifluoroethanol, dichloroacetic acid, fluoraldihydrate, hexafluoroacetone, and dimethyl formamide containing lithium chloride, and said liquid being selected from the group consisting of water, methanol, and acetone.

2. A process according to claim 1 in which the solvent is 85 to 100 percent by weight formic acid.

3. A process according to claim 1 in which the solvent is 40 percent methyl alcoholic calcium rhodanide.

4. A process according to claim 1 in which said liquid is water.

5. A process according to claim 1 in which the polyamide is a mixture of polymerized $\beta$-lactams unsubstituted at the nitrogen atom.

6. A process according to claim 1 in which the $\beta$-lactam is 4-methylacetidin-2-one.

7. A process according to claim 1 in which the $\beta$-lactam is 3,4-dimethylacetidin-2-one.

References Cited

UNITED STATES PATENTS

| | | | |
|---|---|---|---|
| 2,783,894 | 3/1957 | Lovell et al. | 264—41 UX |
| 3,427,179 | 2/1969 | Davis | 264—41 UX |
| 3,520,804 | 7/1970 | Hoke | 210—500 X |
| 3,567,632 | 3/1971 | Richter et al. | 210—500 X |
| 3,538,059 | 11/1970 | Beermann et al. | 260—78 L |
| 3,549,580 | 12/1970 | Schmidt et al. | 260—78 L X |

FOREIGN PATENTS

| | | | |
|---|---|---|---|
| 1,141,452 | 12/1962 | Germany | 260—78 L |

PHILIP E. ANDERSON, Primary Examiner

U.S. Cl. X.R.

117—124 E; 210—500; 260—30.8 R, 31.2 N, 32.6 N, 32.8 N, 33.4 R, 78 L, 78 S; 264—331